United States Patent [19]

Hill

[11] Patent Number: 4,704,876
[45] Date of Patent: Nov. 10, 1987

[54] CRYOGENIC REFRIGERATION SYSTEM

[76] Inventor: Ralph P. Hill, 10170 S.W. Kable St., Tigard, Oreg. 97224

[21] Appl. No.: 895,875

[22] Filed: Aug. 12, 1986

[51] Int. Cl.$^4$ .............................................. F25D 3/12
[52] U.S. Cl. ...................................... 62/388; 62/407
[58] Field of Search .................. 62/239, 384, 388, 66, 62/407; 165/168, 169

[56] References Cited

U.S. PATENT DOCUMENTS

| | | |
|---|---|---|
| 1,975,177 | 8/1932 | Sherrick . |
| 2,325,371 | 8/1941 | Clerc . |
| 2,508,385 | 5/1950 | Hall ..................................... 62/239 |
| 2,731,807 | 1/1950 | Allyne . |
| 3,561,266 | 2/1971 | Rubin ..................................... 62/66 |
| 3,783,633 | 8/1972 | Glynn . |
| 4,248,060 | 7/1979 | Franklin, Jr. . |
| 4,299,429 | 2/1980 | Franklin, Jr. . |
| 4,376,511 | 4/1981 | Franklin, Jr. . |
| 4,381,649 | 3/1982 | Franklin, Jr. . |
| 4,404,818 | 9/1982 | Franklin, Jr. . |
| 4,502,293 | 3/1985 | Franklin, Jr. . |
| 4,593,536 | 6/1986 | Fink et al. . |

OTHER PUBLICATIONS

American Frozen Food Institute study titled, Executive Summary Report, dated Mar. 1985, "Cryogenic Rail Car Project".

Primary Examiner—Henry A. Bennet
Attorney, Agent, or Firm—Klarquist, Sparkman, Campbell, Leigh & Whinston

[57] ABSTRACT

A railcar refrigerated by carbon dioxide snow has compartment at top for containing a supply of such snow. Openings are provided along each side and end wall for escape of carbon dioxide gas from compartment so it can flow down along each side of load and envelop same. Floor of car is formed with longitudinal channels with manifolds at ends of car to cause flow of gas toward one end along side walls and then through interior channels to discharge opening at opposite end.

6 Claims, 7 Drawing Figures

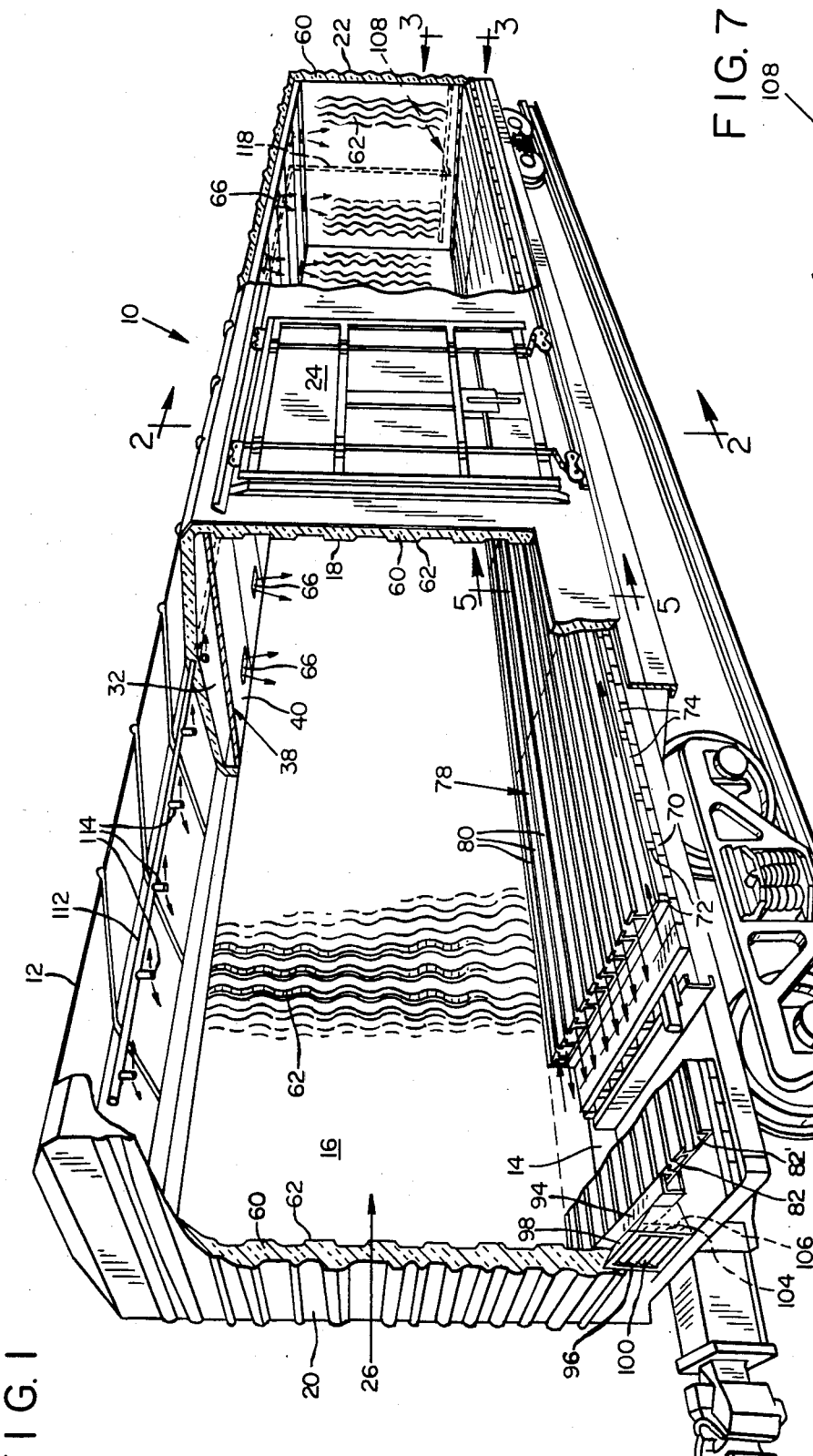
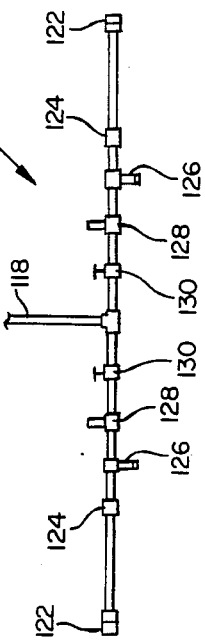
FIG. 1
FIG. 7

CRYOGENIC REFRIGERATION SYSTEM

BACKGROUND OF INVENTION

This invention relates to a refrigeration system for vehicles, and more particularly to the construction of storage compartments for utilizing carbon dioxide as a refrigerant in transporting products by vehicles such as trucks, trailers, rail cars and the like.

Some mechanical systems utilizing expanded carbon dioxide gas as the refrigerant have been proposed heretofore. One such system is disclosed in Rubin U.S. Pat. No. 3,561,266 issued Feb. 9, 1971. In the Rubin patent, carbon dioxide gas was expanded within containers at the top of the vehicle storage area so as to form a deposit of snow within the containers. The snow provided a cold surface on the bottom of the containers to cool the circulating air within the vehicle. In addition, in one embodiment a single vent was provided in each container to permit carbon dioxide gas to flow into the storage area. In another embodiment, the carbon dioxide gas was vented to the atmosphere outside of the container.

In U.S. Pat. No. 4,502,293, issued Mar. 5, 1985, to Paul R. Franklin Jr., a carbon dioxide cooling system is shown wherein carbon dioxide snow is deposited within a compartment positioned at one end of the vehicle and within a passageway positioned just beneath the top wall of the vehicle. Fans are provided to draw air around the containers in the end compartment and through the passageway over the carbon dioxide snow so that the cooled air would circulate through the vehicle and maintain the contents at the desired cold temperature.

Other patents disclosing the use of carbon dioxide either in the form of blocks or snow within containers which are not open to the vehicle include: U.S. Pat. No. 1,975,177, the Sherrick U.S. Pat. No.; 2,325,371, Clerc U.S. Pat. No.; 2,731,807, Allyne U.S. Pat. No.; 3,783,633, Glynn et.al U.S. Pat. No.; 4,248,060, Franklin, Jr. U.S. Pat. Nos.; 4,299,429, 4,376,511, 4,381,649, and 4,404,818.

The American Frozen Food Institute conducted a study program trying to develop a suitable cyrogenic system for shipping frozen foods in rail cars. In a Executive Summary Report dated March 1985, one prototype railcar is described wherein liquid carbon dioxide is stored in a series of elongated tanks spaced lengthwise to the car beneath an aluminum floor. The liquid carbon dioxide was vented onto the top of the load to form a blanket of carbon dioxide snow on the top and around the load. The blanket was rebuilt as necessary during shipment.

Because of the direct contact of the snow with the load, the products in some parts of the load were reduced to below minus ninety degrees F. At such a low temperature, some products became very brittle and broke. Also, because the loads are giving off moisture the direct exposure of the snow making nozzles to the moisture caused them frequently to freeze closed. And the weight of the carbon dioxide tanks took away usable payload.

Fink et al, U.S. Pat. No. 4,593,536, represents a further development of the American Frozen Food Institute program. Therein a rail car is illustrated wherein carbon dioxide snow is deposited in a bunker at the roof of the car. Vents are provided along one sidewall for the escape of carbon dioxide so that it can flow downwardly along such side wall, through lateral passageways beneath the floor, and thence upwardly along the opposite sidewall and back across the load, all by convection. However, in practice the cold carbon dioxide gas did not effectively flow upwardly along the opposite side wall and the product adjacent such wall in a car so designed would get undesireably warm, particularly in warm weather.

SUMMARY OF THE INVENTION

It is an object of the present invention to provide an improved shipping container for frozen food utilizing liquid carbon dioxide as the refrigerant.

More particularly it is an object of the invention to provide a rail car construction utilizing carbon dioxide snow as the refrigerant wherein all the contents of the car will be maintained within desireable temperature limits during shipment.

In accordance with the illustrated embodiment a railcar heavily insulated on all sides is provided with a lengthwise compartment at its top in which a deposit of carbon dioxide snow may be formed. The bottom of the compartment is provided with openings along each side and end wall of the car through which sublimating carbon dioxide gas may escape. Each of the walls is formed with sinuous channels to permit flow of the carbon dioxide gas towards the floor along the surface of the adjacent load. The floor of the car is formed with open top lengthwise channels to receive the carbon dioxide gas and to conduct it in contact with the lower surface of the load to one end of the car whereat a discharge manifold collects the gas for discharge through the adjacent end wall of the car. With such construction, product within the car will be maintained within desired temperature limits throughout transit.

A BRIEF DESCRIPTION OF THE DRAWINGS

FIG. 1 is a perspective view partly broken away of a refrigerated rail car incorporating the present invention.

FIG. 7 is a view of the inlet plumbing.

DETAILED DESCRIPTION OF THE INVENTION

Figure 2:
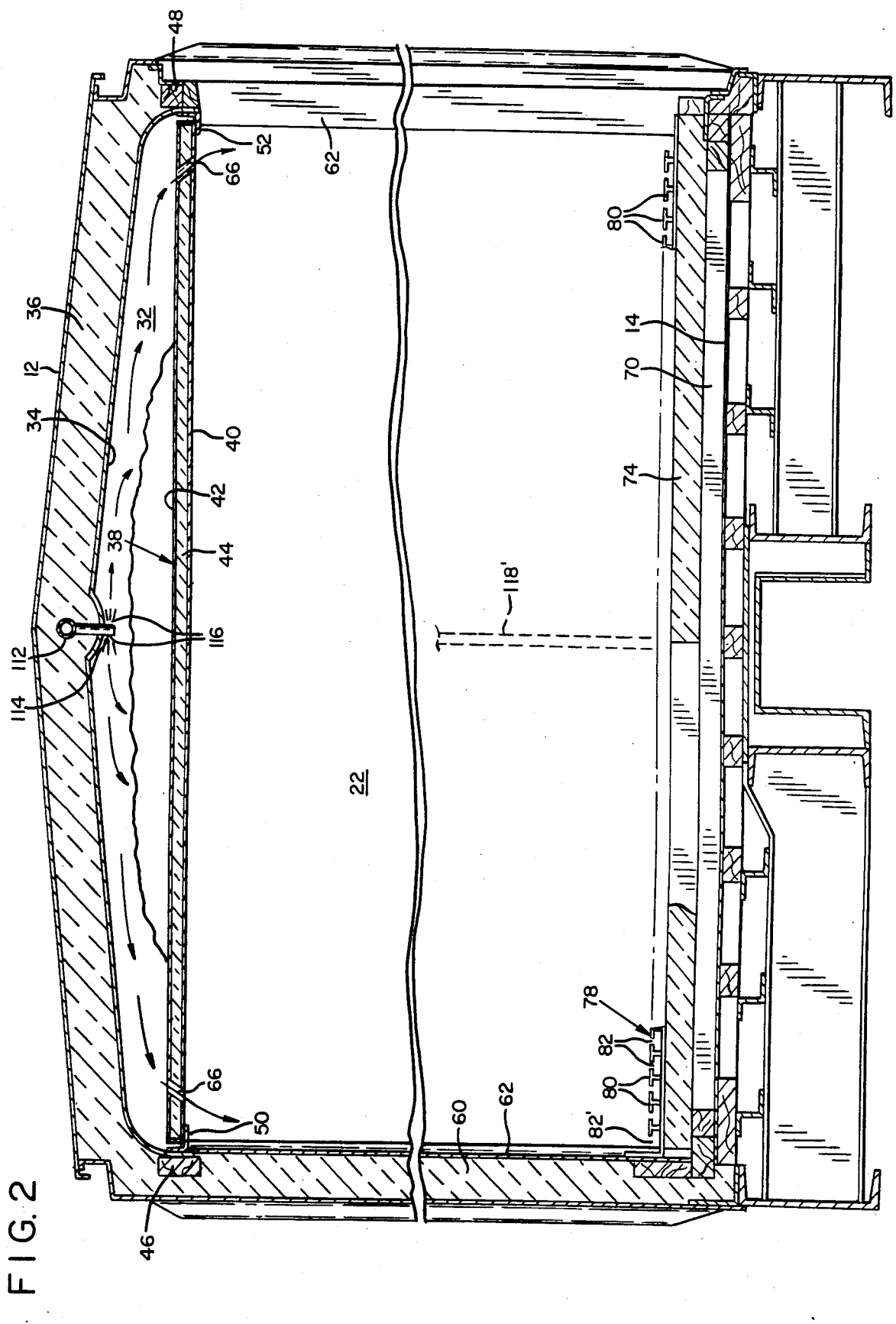
FIG. 2 is an enlarged cross-sectional view of the rail car of FIG. 1 taken generally along line 2—2.

Illustrated at 10 is a rail car constructed in accordance with the present invention. While the invention is illustrated in connection with a rail car, it will be apparent that the invention could be incorporated in other types of vehicles such as trucks or trailers.

The rail car 10 is provided with a conventional exterior roof 12, a floor 14, and opposite side walls 16, 18 extending between end walls 20, 22. Each of the side walls 16, 18 is preferably provided with sliding doors, only the door 24 in sidewall 18 being illustrated, and which doors are preferably heavily gasketed (not shown) to minimize leakage of air into or refrigerant out of the interior of the rail car. The foregoing elements define, of course, a storage area 26, in which the product to be transported is positioned.

Referring first to the top of the rail car, means are provided for maintaining above the storage area 26 a deposit of carbon dioxide snow as a refrigerant source for the load contained within the storage area. Referring more particularly to FIGS. 1 and 2, the car 10 is formed with a compartment 32 at the top for retaining a supply of carbon dioxide snow. The compartment 32 has a top wall 34 formed of fiberglass or other suitable material extending substantially parallel to the roof 12. The wall 34 is spaced from the roof 12 by any suitable support and in which space is provided a layer of suitable foam insulation 36. The bottom wall 38 of the compartment 32 is defined by a pair of horizontally spaced panels 40, 42, which extend from one side of the car to the other and between which is positioned a further layer of foam insulation 44. As shown in FIG. 2, the panel 34 defining the top wall of the compartment curves down at its opposite sides adjacent stringers 46, 48 which extend the length of the car. The opposite ends of the wall 34 are secured to the adjacent stringer so that the wall is supported thereby. Secured to the stringers 46, 48, respectively, are a pair of L shaped brackets 50, 52, over which the bottom compartment wall 38 extends and is supported thereby. The stringers 46, 48 are suitably supported by means not shown from the frame of the car 10. As will be apparent the wall 38 also defines a ceiling for the storage area 26.

The side walls and end walls of the car 10 are likewise heavily insulated with a layer of foam insulation 60. A liner 62 is provided on each of the side walls 16, 18 and end walls 20, 22 on the inner side of the insulation and which liner is preferably formed of sinusoidal fiberglass sheets backed by plywood. Such panels are shown in U.S. Pat. No. 3,206,946, Lindersmith, et al. The liners 62 are supported from the frame of the rail car by conventional Nelson studs (not illustrated), or other suitable means. The liners 62 define downwardly directed sinusoidal channels from ceiling to floor as best shown in FIG. 1. The bottom wall 40 of the compartment 32 is provided with a plurality of openings 66 along each of the side walls 16, 18 and along each end wall 20,22 of the car and which openings are preferably slanted toward the adjacent wall. These openings are provided for the flow of carbon dioxide gas sublimating from the snow contained within the compartment 32 and which gas may then flow downwardly along the adjacent wall through the sinusoidal passageways defined thereby. The openings on opposite walls preferably are offset with respect to each other.

Figure 5:
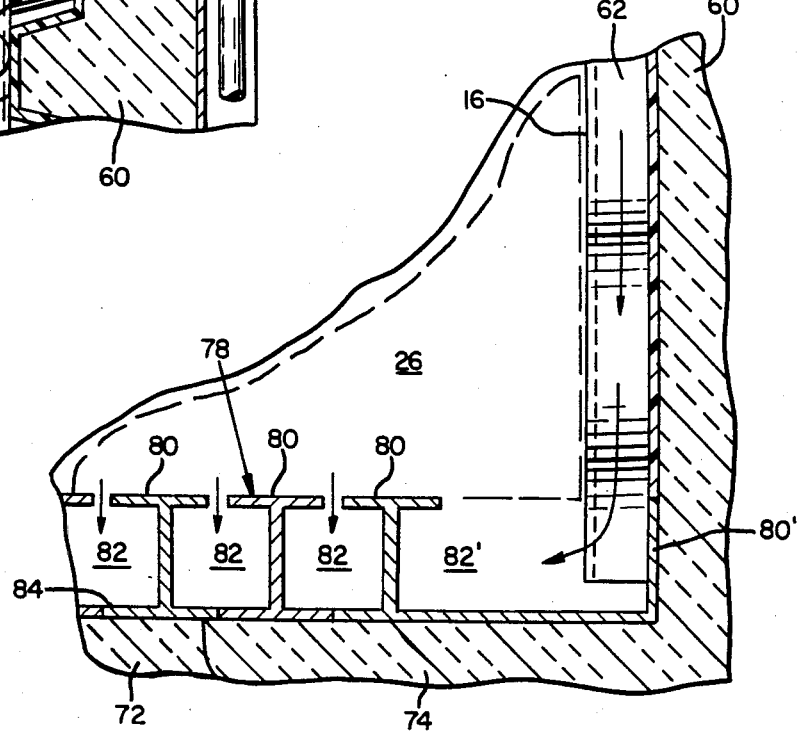
FIG. 5 is a fragmentary sectional view taken along line 5—5 of FIG. 1.

The floor of the car 10, over a conventional decking layer 70, is provided with a plurality of transverse stringers 72, between which is disposed a layer 74 of foam insulation. Supported on and extending over the transverse stringers 72 is a load supported decking 78 which comprises a plurality of longitudinally extending elements 80 defining channels 82 extending longitudinally substantially the length of the car. Preferably the decking 78 is that sold under the trademark "All - Air" and conventionally utilized for flooring in trucks and other refrigerated containers. Such decking comprises a base plate 84 from which the floor elements 80 extend upwardly. Except for the floor elements 80' adjacent the side walls 16 and 18 the elements 80 are T-shaped. However, the floor elements 80' next adjacent the sidewalls as best shown in FIG. 5, are simply an upstanding flange so as to provide an unobstructed opening into a channel 82' defined by the element 80' and the adjacent element 80. Thus carbon dioxide gas flowing down a side wall 16, 18 may flow freely into the adjacent channel 82'.

Figure 3:
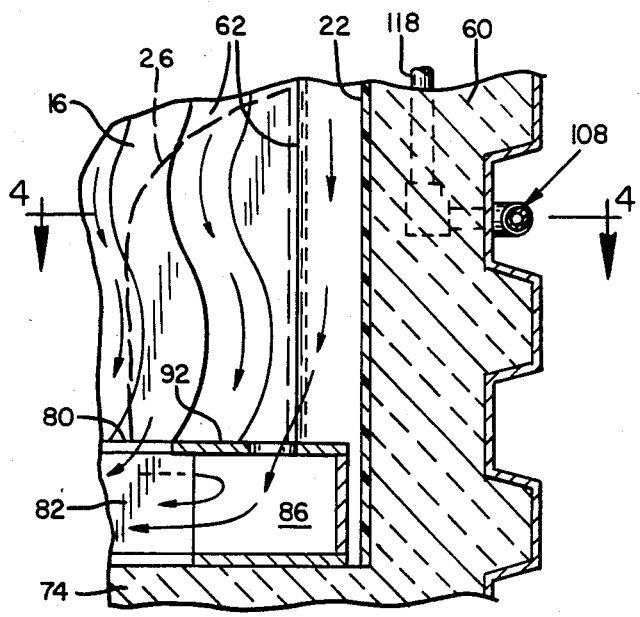
FIG. 3 is an enlarged, fragmentary cross-sectional view of the rail car looking in the direction of the arrows 3—3 of FIG. 1.
Figure 6:
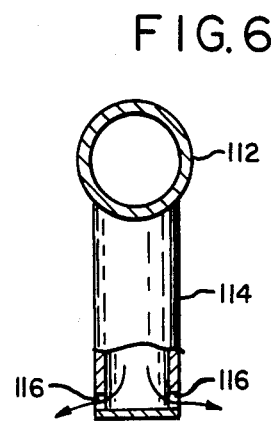
FIG. 6 is an enlarged fragmentary view of the end of a snow making nozzle.
Figure 4:
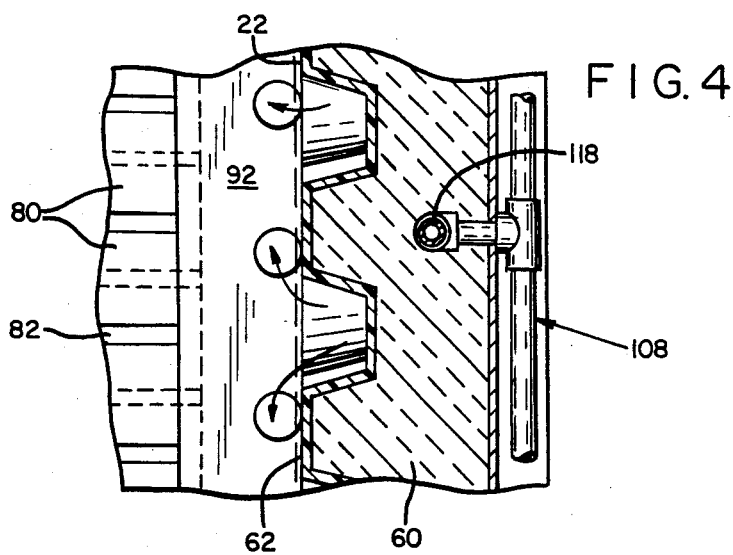
FIG. 4 is a fragmentary cross-sectional view of the rail car taken generally along line 4—4 of FIG. 3.

The floor elements 80, 80', terminate short of the end wall 22 so as to provide a plenum 86 between the liner 62 of the end wall 22 and the ends of the floor elements, the purpose of which will be made apparent hereinafter. A perforated plate 92 preferably extends across the width of the car between the sidewalls 16, 18 between the ends of floor elements 80, 80' and the adjacent liner 62 of wall 22, see FIG. 3.

Adjacent to the opposite end 20 of the car, a collecting manifold 94 is provided and which is arranged to open into all of the channels 82 but excluding the sidemost channels 82'. The manifold 94 is arranged to exhaust carbon dioxide gas to the outside through an opening 96 positioned in the end wall 20 directly opposite the manifold. A duct 98 connects the manifold to the opening. Downwardly slanted fixed louvers 100 preferably are positioned in the opening to provide protection from rain or the like. In addition an automatic back draft shutter is preferably provided in the duct 98 to permit flow through the duct only when the pressure inside the car 10 is greater than that of the surrounding atmosphere. Such shutter preferably comprises a plurality of free swinging horizontally hinged vanes 104 having weatherstrips 106 on each to provide an effective seal in the closed position thereof.

Means are provided for filling the compartment 32 with carbon dioxide snow. In the illustrated embodiment a distribution pipe 112 extends from car end 22 substantially the length of the car through the top insulation 36. Extending downwardly from the distribution pipe 112 into the compartment 32 are a plurality of distribution nozzles 114. Each of the nozzles 114 consists of a pipe closed at its bottom end but provided with two diametrically opposite apertures 116 above the closed end which have the dual purpose of permitting carbon dioxide liquid to spray outwardly and form a snow as the compartment is filled and also of draining any liquid carbon dioxide from the nozzle after filling of the compartment has been completed so that the nozzle remains free and open in the event that additional snow has to be formed within the compartment during a shipment.

The distribution pipe 112 is connected to a downwardly extending filler pipe 118 that is connected to a filling assembly 108 which in turn is duplicated on opposite sides of the car so the assembly can be connected to a source of liquid carbon dioxide at either side of the railroad track. The filling assembly comprises on each side a quick connect adapter 122 for connection to a liquid carbon dioxide source, a strainer 124, a drain line 126, a pressure relief safety valve 128, and a shut off valve 130.

Suitable temperature sensors can be provided at desired locations within the car and connected to a temperature gauge 130 or gauges which may be located at the end 22 or at some other convenient location on the exterior of the car.

Preferably the foam insulation in the ceiling, floor and walls is formed in place in conventional manner after the linings, floor structure, etc. is in place so as to fill as nearly possible all the space where insulation is desired.

OPERATION

When the car is to be utilized for the transport of frozen foods, the compartment 32 is charged with carbon dioxide snow and the car permitted to stand until the temperature has been sufficiently reduced for loading. As the carbon dioxide snow within the compartment 32 sublimates, the cold carbon dioxide gas will discharge through the gas ducts 66 in the bottom wall 40 of the compartment and will flow downwardly along the sides of the car and primarily into the sidemost channels 82'. If the car is not loaded, some of the carbon dioxide gas will, of course, spill across the top of the side most floor elements 80' and into the inner channels 82. The gas will flow towards the discharge manifold 94 and exhaust through the exit opening 96.

When the temperature has been lowered sufficiently, the car doors can be opened and the car loaded with the frozen product that is to be shipped. Usually the load will be compacted snugly positioning product adjacent to the liners 62 of the side walls 16, 18 and the end walls 20, 22. When the car is fully loaded, the doors will again be closed and the compartment 32 fully charged with carbon dioxide snow. A 60 foot car, for example, will accept a charge of about 12 tons of carbon dioxide and with five inches of urethane foam insulation on the outer walls such a charge is sufficient to maintain temperatures of zero degrees Fahrenheit or below for a period of twelve days during summertime conditions.

When loaded, the carbon dioxide sublimating from the snow will escape through the gas discharge openings 66 and will flow downwardly along the sides and the ends of the car through the sinusoidal channels defined by the liners 62 and the adjacent load. The gas flowing down the sides 16, 18 will flow into the side channels 82' and thence will flow towards the end 22 of the car, and into the plenum 86, thence into the center channels 82 through which the cold carbon dioxide will flow towards the opposite car end 20 and into the collecting manifold 94. The carbon dioxide flowing down the end wall 22 will flow through plate 92 into the plenum 86 and thence into the inner channels 82 while the gas flowing down the end wall 20 will flow directly into the collecting manifold 94. Flow of the cold carbon dixoide gas through the channels 82, 82' is desired, of course, so as to provide a refrigerating layer beneath the load that is supported on the floor elements 80. Some of the carbon dioxide gas will, of course, seep through the cracks and crevices of the load and directly into the channels 82 and thence to the manifold 94. As the carbon dioxide warms and pressure within the car increases some of the gas will escape through the opening 96.

Because the carbon dioxide snow is not deposited directly upon the load but is maintained in the compartment 32, which is insulated from the top of the load by the bottom compartment wall 38, the product shipped within the car will not be reduced to an unacceptable temperature to impair its durability. Moreover, because the cold carbon dioxide gas is flowing downwardly on each of the opposite sides and on the ends of the car and in direct contact with the bottom of the load, all parts of the load will be maintained at a desirably low temperature to preserve the quality of the product shipment.

Obviously, if the duration of the shipment is such that the snow begins to exhaust and the temperature within the car begins to rise towards unacceptable levels, the compartment 32 can easily be recharged with a supplemental supply of carbon dioxide snow so that the desired temperature are maintained until the car is unloaded.

Having illustrated and described the preferred embodiment of the present invention, the scope of the present invention should be determined by the following claims.

I claim:

1. In a container adapter to be maintained in a refrigerated condition from the sublimation of carbon dioxide snow the combination comprising:
    a storage area defined by a floor, a pair of opposed side walls, a pair of opposed end walls, and a ceiling means;
    an insulated roof positioned above said ceiling means and defining therewith a compartment for supporting a supply of carbon dioxide snow, said compartment extending substantially the full length of said car;
    means in said compartment for forming carbon dioxide snow and means for connecting said carbon dioxide snow forming means to a supply of liquid carbon dioxide;
    a plurality of openings through said ceiling means adjacent each of said side walls and end walls for permitting the flow of sublimated carbon dioxide gas from said compartment;
    each of said walls being corrugated to define a plurality of channels therein open-sided toward the interior of the container whereby said carbon dioxide gas may flow from said openings in said ceiling means downwardly through said channels between said walls and a product load disposed in said container toward said floor.

2. The container of claim 1 wherein said ceiling means comprises a layer of insulation to inhibit the transfer of heat through said ceiling means from said storage area.

3. The container of claim 1 wherein said floor is defined by a plurality load supporting elements defining open top floor channels extending substantially from one end wall to the other.

4. The container of claim 3 wherein a plenum interconnects the said floor channels at one end of that container, and discharge means at the opposite end of said container in communication with all of said floor channels except the channels next adjacent each side wall, said discharge means communicating with the atmosphere exterior to said container.

5. The container of claim 1 wherein said wall channels are sinuous.

6. A rail car adapted to be maintained in a refrigerated condition from the sublimation of carbon dioxide snow comprising;
    a storage area defined by a floor, a pair of opposed side walls, a pair of opposed end walls, and a ceiling means;
    said floor comprising a plurality of parallel load supporting elements extending substantially from one end wall to the other end wall and spaced apart laterally of the car to define a plurality of floor channels extending substantially from one end wall to the other;
    an insulatted roof positioned above said ceiling means and defining therewith a compartment for supporting a supply of carbon dioxide snow, said compartment extending substantially the full length of said car;

means in said compartment for forming carbon dioxide snow and means for connecting said carbon dioxide snow forming means to a supply of liquid carbon dioxide;

a plurality of openings through said ceiling adjacent each of said side walls and end walls for permitting the flow of sublimated carbon dioxide gas from said compartment;

each of said walls being corrugated to define a plurality of channels therein open-sided toward the interior of the container whereby said carbon dioxide gas may flow from said openings in said ceiling means downwardly through said channels between said walls and a product load disposed in said container toward said floor;

a discharge means for discharging warmed carbon dioxide gas exteriorly of said car comprising a manifold disposed adjacent one end wall in communication with all of said channel at said end except the channels next adjacent each of said side walls, and duct means connected to and communicating with said manifold and with the exterior of said car;

and means defining a plenum adjacent the opposite end wall interconnecting all of said channels, whereby carbon dioxide gas flowing down a said side wall will flow into the channel next adjacent thereto and thence toward said opposite end wall, into said plenum, through the inner channels toward said one end wall, into said manifold, and thence through said discharge means and exteriorly of said car.

* * * * *

UNITED STATES PATENT AND TRADEMARK OFFICE
CERTIFICATE OF CORRECTION

PATENT NO. : 4,704,876

DATED : November 10, 1987

INVENTOR(S) : RALPH P. HILL

It is certified that error appears in the above-identified patent and that said Letters Patent is hereby corrected as shown below:

In the Claims:

Claim 1, column 6, line 9, "adapter" should be -- adapted --.

Claim 4, column 6, line 44, "that" should be -- the --.

Signed and Sealed this

Twenty-fifth Day of October, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,704,876
DATED : November 10, 1987
INVENTOR(S) : Ralph P. Hill

It is certified that error appears in the above-identified patent and that said Letters Patent is hereby corrected as shown below:

Claim 1, column 6, line 19, "car" should read -- storage area --.

Signed and Sealed this

Twenty-fifth Day of February, 1992

Attest:

HARRY F. MANBECK, JR.

*Attesting Officer*          *Commissioner of Patents and Trademarks*